United States Patent [19]

Lamo

[11] Patent Number: 5,517,020
[45] Date of Patent: May 14, 1996

[54] SHIELDED, PHOTO-ACTUATED, DIRECT CURRENT OUTSIDE LAMP

[76] Inventor: Gerald E. Lamo, 3730 Maryville Pk., Knoxville, Tenn. 37920

[21] Appl. No.: 997,282

[22] Filed: Dec. 23, 1992

[51] Int. Cl.⁶ .................................................... H01J 40/14
[52] U.S. Cl. .................................. 250/214 AL; 315/159
[58] Field of Search ...................... 250/214 AL, 214 B, 250/214 RE; 315/158, 159; 307/117, 10.8

[56] References Cited

U.S. PATENT DOCUMENTS 3,628,085  12/1971  Brock ....................................... 315/159
3,629,649  12/1971  Zotto ........................................ 315/159

*Primary Examiner*—David C. Nelms
*Assistant Examiner*—Que T. Le
*Attorney, Agent, or Firm*—Judy Winegar Goans

[57] ABSTRACT

An improved lamp for use with travel trailers, motorhomes, recreational vehicles, temporary shelters, and the like, has an automatic photosensor-actuated on/off control circuit and shielding to protect the photosensor from the effects of stray light sources.

4 Claims, 3 Drawing Sheets

SHIELDED, PHOTO-ACTUATED, DIRECT CURRENT OUTSIDE LAMP

SUMMARY OF THE INVENTION

This invention relates to electric lamps having automatic on/off control circuits and, more particularly, to a lamp having a photosensor-actuated control circuit and that is adapted for outdoor use with a recreational vehicle, travel trailer, or motor home.

BACKGROUND OF THE INVENTION

Automatic lamp control circuits are well known. Typically, a control circuit utilizes a photosensor to sense the ambient light level. The circuit turns the lamp on at night and off during the day. Such automatic control circuits are particularly useful for nightlights, outdoor lights such as street lights, and for lamps that are in inaccessible locations.

While conventional automatic light systems work well for homes and other fixed buildings with good exposure and a ready source of AC power, such systems may be less suitable for travel trailers, motorhomes, and recreational vehicles. For these applications, lamps typically use DC power sources, which is more readily available than AC power sources. Lamps that work from DC power sources are also known. Such lamps are available commercially for applications such as closets, crawl spaces, and tool sheds, which are typically shielded both from outside light and from other light sources such as passing vehicles.

By contrast, travel trailers, motorhomes, and recreational vehicles pose a different set of problems. For these applications, a lamp is frequently located next to a passenger-side door and under an awning. A conventional lamp with photosensor may not operate properly in an under-awning location. In some cases, the awning may block light to the photosensor, causing it to actuate the lamp prematurely. This may cause the lamp to operate during daylight hours.

Another set of problems arise when the lamp itself emits light that is reflected from various surfaces, including the undersurface of the awning, sidewall of the RV or trailer, surfaces of nearby objects, and even from the ground. Particularly if the awning has a shiny or reflective undersurface, reflected light from the lamp may strike the photosensor, shutting down the lamp. This shut-off can occur as a result of reflectance even when ambient light levels are low. Where a lamp with a light sensor is situated under an awning, reflected light from various surfaces can also cause the lamp to cycle on and off without regard to ambient light.

In addition, a typical outside location may be vulnerable to stray light sources such as headlights from passing vehicles or light from the interior of the recreational vehicle or trailer. After dark, opening the door to the trailer or vehicle allows light from the interior to reach the lamp, which may cause the photosensor to shut off the lamp just when light is needed most, such as upon exiting the vehicle. In these circumstances, it is desirable to have a lamp that is sensitive to ambient light, that is not overly sensitive to reflected light, and that will operate without the availability of AC current. In a location with many stray light sources, it may also be useful to be able to override the light sensor circuit.

Accordingly, it is a general object of the present invention to provide a lamp assembly with an automatic control circuit suitable for outside use with a recreational vehicle, travel trailer, motor home, or similar application.

One object of this invention is to have a reliable light fixture which operates automatically in response to the availability of ambient light.

Another object of this invention is to have a lamp that will operate on DC current. A further object of the invention is to have a lamp that will respond to ambient light from an under-awning location where light fixtures are often placed on travel trailers, motorhomes, and recreational vehicles. It is a further object of the invention to provide a manual override for the lamp. It is a still further object of the invention to provide an attractive automatic outside lamp which can be installed and operated in a conventional outside location on travel trailers, motor homes, and recreational vehicles. It is a further object of the present invention to provide an automatically controlled lamp which is simple in construction and easy to use and install in a conventional location.

According to the present invention, these and other objects and advantages are achieved in a lamp assembly. The RV lamp assembly includes a lamp housing enclosing a light bulb connected to an automatic light control circuit. Electrical leads extend through the lamp housing to connect with a power source in the RV or travel trailer. The light control circuit includes a photosensor for controlling the power delivered to the light bulb in response to a sensed ambient light level. A conventional light bulb for use in a conventional outside light fixture may be used. A conventional RV lamp assembly may be modified in accordance with this invention.

Although this invention is described in terms of a light bulb, it will be noted that any appliance or feature that it is desirable to activate in lowered light levels may be substituted for the light bulb and operated on the same principle. A radio or other music source, security device, or sign may be substituted for the light bulb and housing, for example, with substitutions of circuit elements with appropriate power ratings, for example.

In a first embodiment, the lamp includes a photosensor located to the left side of the lamp assembly adjacent to a tiny hole in the lamp housing. The lamp is mounted on a recreational vehicle or the like in the typical location to the left of the door in the passenger side of the vehicle.

According to another aspect of the invention, the photosensor can be mounted on the RV roof and remotely connected to the remainder of the lamp assembly. In this embodiment, it may be desirable to locate the lamp's switching circuits in the RV near the wall switch that is typically provided for an outside light.

BRIEF DESCRIPTION OF THE DRAWINGS

For a better understanding of the present invention together with other and further objects, advantages and capabilities thereof, reference is made to the accompanying drawings which are incorporated herein by reference and in which.

DESCRIPTION OF THE INVENTION

Figure 1:
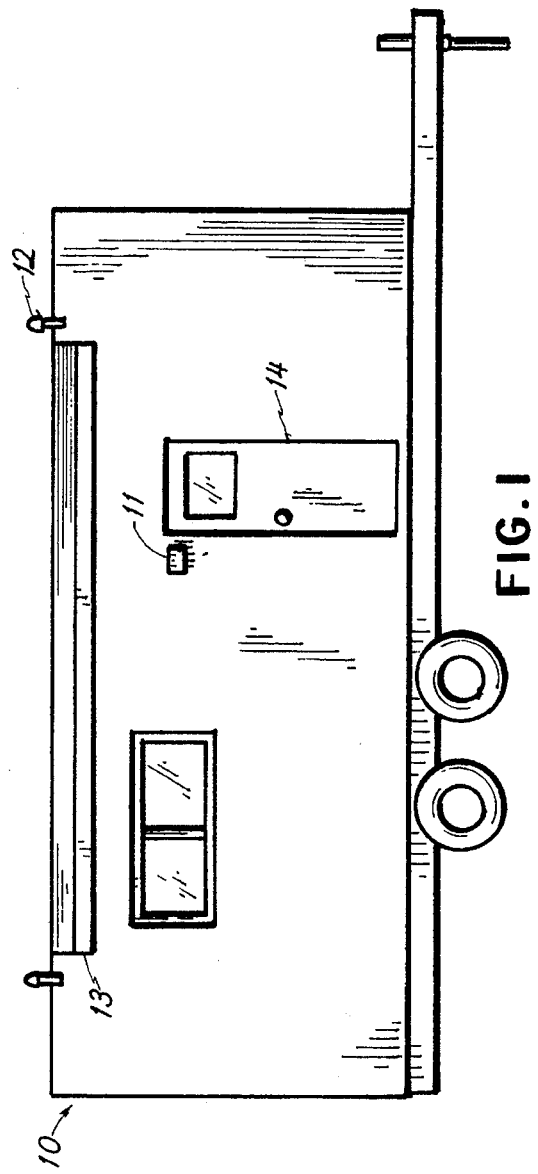
FIG. 1 is a lateral view of a travel trailer showing placement of the lamp relative to the awning, light switch and sensor.

Referring to the figures, FIG. 1 shows the typical layout for a recreational vehicle, mobile home, or travel trailer, shown generally at 10. A first preferred location of the photosensor is in the lamp 11. The photosensor can also be mounted remotely on the roof of the RV, as shown at 12. In the first position, the lamp 11 is typically located under an awning 13 and adjacent a door 14. For purposes of convenience and not of limitation, the term RV will be used herein to refer to recreational vehicles, travel trailers, and motor homes and, unless otherwise indicated, should be understood to apply interchangeably to all such vehicles or means of shelter. Also for purposes of convenience, the term "light bulb" will be used to refer to that portion of the invention which is actuated in reponse to changing light levels.

Figure 2:
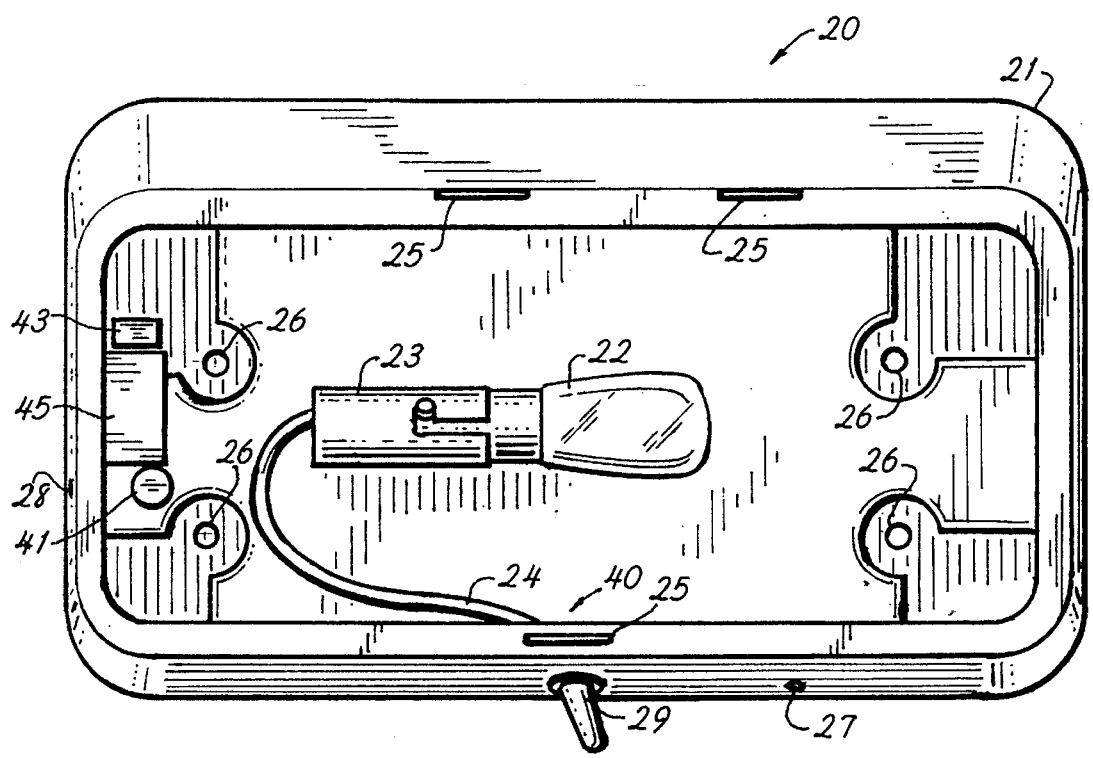
FIG. 2 is a plan view of the preferred embodiment of a lamp showing the placement of photoelectric sensors.

A lamp assembly in accordance with the present invention is shown in FIG. 2. The lamp assembly, shown generally at 20, includes a lamp housing having a light bulb 22 mounted therein. A socket 23 typically serves as a means for mounting the light bulb 22 into the housing as well as for providing electrical connection between the light bulb 22 and a power source. An electrical lead 24 connects the light socket 23 to a switching circuit 40 (shown in FIGS. 4 or 5).

Figure 3:
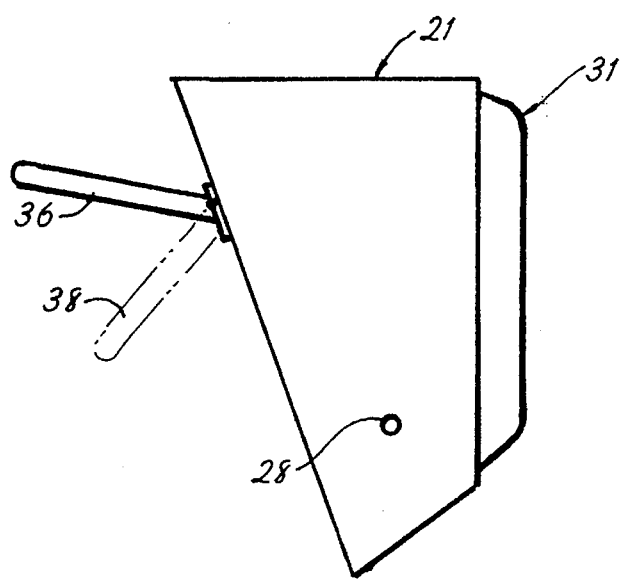
FIG. 3 is a lateral view of the preferred embodiment of a lamp.

The lamp assembly 20 illustrated in FIGS. 2 and 3 uses a conventional Bargman lamp fixture, model no. 30-78-501 or model no. 30-78-503, adapted in accordance with the present invention. For this fixture, the housing includes a removable, light-transmissive cover 31 (shown in FIG. 3) which attaches by tabs into slots 25 to the housing base 21. The housing base 21 includes mounting sockets 26 for attaching the lamp assembly 20 to an RV. Although the Bargman lamp fixture provides an attractive housing for the lamp assembly, other conventional lamp fixtures may be readily substituted. For purposes of weatherproofing, attractiveness, and consistency of sensor and lamp operation, it is desirable to enclose the entire lamp control circuit other than manual switch controls. In a first embodiment, it is desirable to enclose the light control circuit 40 within the lamp housing. In a second embodiment, it is desirable to enclose the light control circuit 40 in the RV, such as within a wall near a manual switch for an outside lamp. The first embodiment is preferred for a lamp to be installed in an existing lamp location in an RV. The second embodiment may be preferable for a lamp supplied with an RV during its manufacture.

Figure 5:
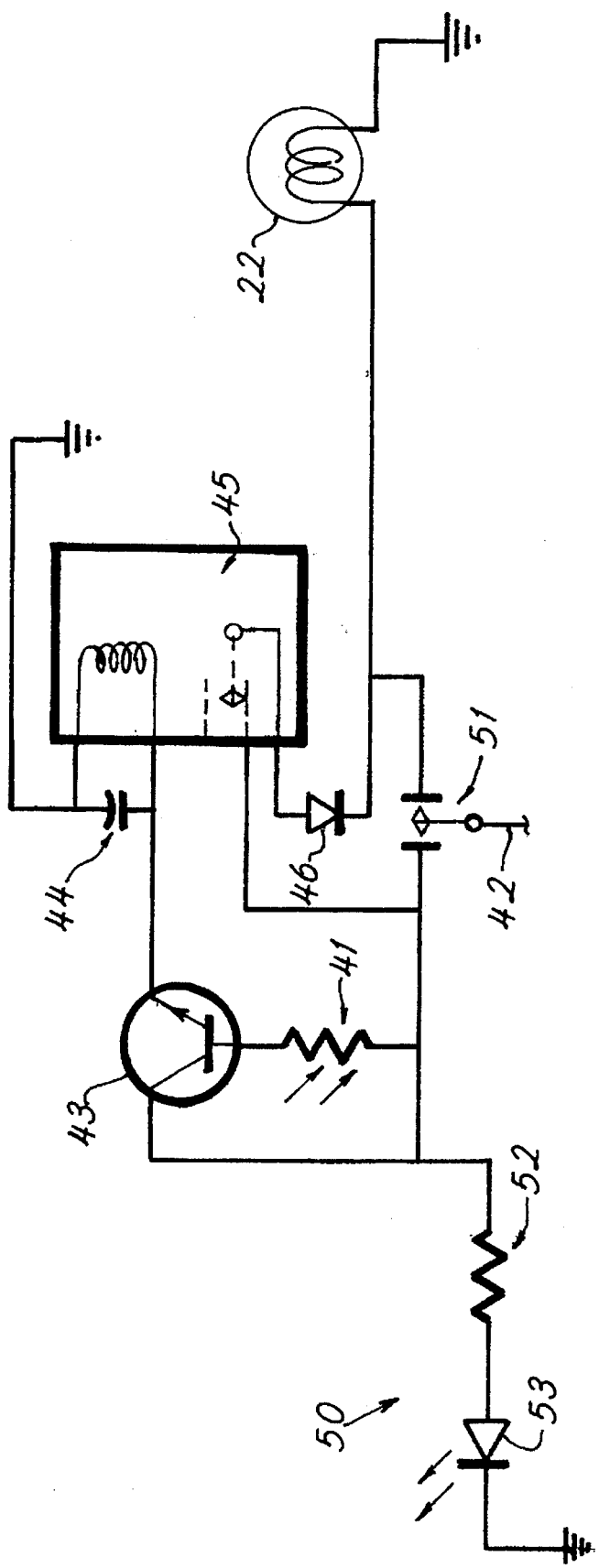
FIG. 5 is a schematic diagram of the preferred embodiment of the lamp control system.

In the first embodiment, photosensor 41 senses light admitted through a hole 28 in the housing base 21, and the other elements of the light control circuit 40 are also enclosed within the housing. A manual override switch control means 29 extends through the housing, and a light-emitting diode display 33 is also a feature of the preferred embodiment. The manual switch control means 29 is illustrated as a toggle-type switch control, although other types of switch controls could be substituted if desired. Preferably, the lamp housing will indicate which setting allows for manual override of the lamp's operation and which setting allows the lamp to operate in automatic or light-sensing mode. In FIG. 5, the side of the switch 51 nearer the light source 22 is referred to as the "manual position", and the side of the switch 51 nearer the photosensor 41 is referred to as the "automatic position". The entire assembly 20 is connected by electrical leads 36 and 38 which extend through the housing, to connect the switching circuit 40 to a DC power source in a recreational vehicle, travel trailer, or the like. Placement of various circuit elements is shown in FIG. 2, but for simplicity of illustration, wiring is not otherwise shown.

Figure 4:
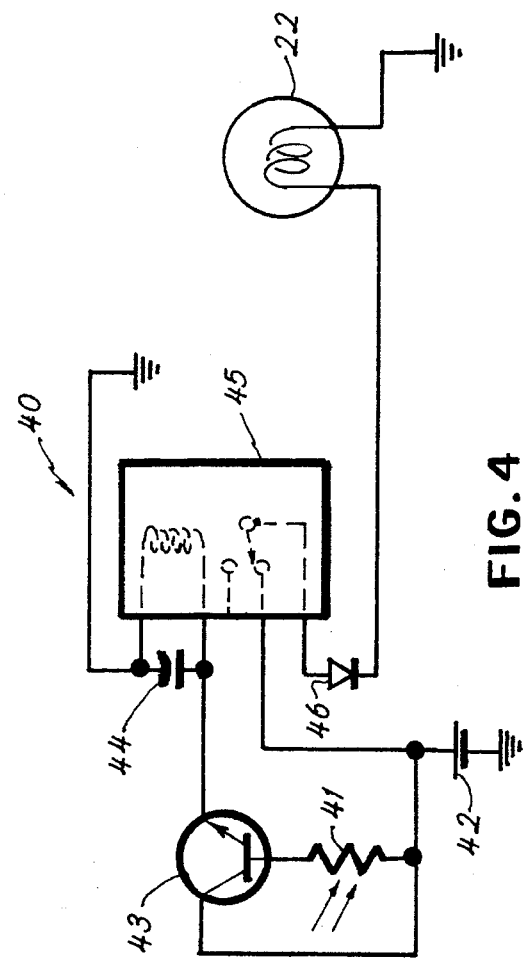
FIG. 4 is a schematic diagram of the lamp control system.

A schematic diagram of a light control circuit 40 is shown in FIG. 4. A photosensor 41 is coupled on a first side to a power source 42, typically 12 volts DC from the RV, and also to the collector of a transistor 43. On its second side, the photosensor 41 is connected to the base of the transistor 43. Since the photosensor 41 is a resistive element, it provides base bias to the transistor 43 in this configuration.

The emitter side of the transistor 43 is connected to a capacitor 44, which is connected to a relay 45 in parallel with the coil of the relay 45. A single-pole, double throw (SPDT) type relay is shown for relay 45. The output of the relay 45 is connected to a diode 46, which is connected to the light bulb 22. The common of the relay 45 is connected to the DC power source 42, and the negative of the power source 42 is connected to ground to complete the circuit. Contacts and coil of relay 45 are shown in dashed lines in the position in which they would be when power is being supplied to the circuit.

One or more photosensors may be used. In the first embodiment, the placement of sensors within the lamp is important to avoid problems from reflectance, shade, and stray light sources. A light-admitting first hole 28 of 5/64 inch diameter adequately screens light reaching a photosensor 41 aligned with the center of the hole 28. The photosensor 41 (not visible in FIG. 3) may be fixed in place immediately adjacent the first hole 28 using a fast-bonding permanent adhesive such as those sold under the general description of "super glue". Once the photosensor 41 is secured in place, the hole 28 is filled with a light-transmissive, non-conducting caulking substance such as clear silicone to seal the photosensor 41 against moisture and dirt. The back of the photosensor 41 and other light control circuit 40 elements, particularly including the relay 45 and transistor 43, are also covered with a non-transparent, non-conducting caulk such as silicone.

In the second embodiment, one or more photosensors 41 may be placed in a light-transmissive, weatherproof housing (not shown), which may be mounted on a roof of the RV and electrically connected to the remainder of the light control circuit 40. In this embodiment, the photosensor 41 is positioned to sense ambient light and is shielded from many of the stray light sources that interfere with operation in an under-awning position.

In the preferred embodiment, shown in FIG. 5, a switch 51 is inserted between the power source 42 and light control circuit 40, and an indicator lamp is provided by adding an indicator circuit, shown generally at 50, between the photosensor 41 and the collector of the transistor 43, as shown. The indicator circuit 50 comprises a second resistor 52 in series with a light-emitting diode (LED) 53 and ground.

In the first embodiment, the LED 53 is preferably placed in a second small hole 27 in the front of the light fixture and secured in place using a super glue-type glue. A drop of black silicone or other non-conducting, non-light transmissive caulk applied over the LED 53 to seal against moisture and dirt. In the second embodiment, the LED 53 and control means for the manual switch control means 29 are preferably placed in or near a manual light control switch normally present inside the RV.

Looking first at the circuit shown in FIG. 4, power is supplied from the RV power source 42 to the photosensor 41. The light control circuit 40 responds to the signal from photosensor 41 to turn light bulb 22 off during the day and to turn light bulb 22 on at night. When light strikes the photosensor 41, its internal resistance drops, supplying voltage to the base of transistor 43 and through transistor 43 to the coil of relay 45. Voltage on the coil of relay 45 opens contacts within the relay 45, preventing current from reaching the light bulb 22. In the absence of light to the photosensor 41, its resistance is high, the transistor 43 does not conduct current to the coil of the relay 45, and power is supplied through the relay 45 to the light bulb 22. A diode 46 is placed in the circuit 40 intermediate the light bulb 22 and relay 45. The use of diode 46 brings the voltage back down to the normal voltage rating of the light bulb. As the light level decreases, the internal resistance of photosensor 41 increases, de-energizing the coil and providing power through the relay 45 to the diode 46 to the light bulb 22.

With the switch 51 in the manual position, the 12 volts DC power from the RV is supplied directly to the light bulb 22. In the manual position, diode 46 prevents voltage from being supplied back to the control system. In the automatic position, the diode 46 causes an approximate 1 volt drop in voltage to the light bulb 22. This one-volt drop in voltage is advantageous due to the fact that almost all travel trailers and motorhomes make use of converters to supply power to the 12-volt DC system and to also charge the batteries. When a converter is in use, the voltage supplied to the system is approximately 1 volt higher than the disconnected voltage rating of the batteries in order to charge the batteries. This slight increase in voltage is also supplied to the normal 12-volt DC lighting, which may shorten the life of the bulb.

When the switch 51 is in the automatic position and the switch inside the RV is in the on position, 12 volts will also be supplied to resistor 52 which reduces the voltage to LED 53, causing LED 53 to light up, enabling the user to tell at a glance whether or not the switch is in the automatic position and the inside light switch is on.

Examples of suitable circuit components which can be readily obtained from commercial sources are as follows:

| Light Fixture | Bargman model no. 30-78-501 or model no. 30-78-503 |
| --- | --- |
| Light bulb 22 | 12 volt light bulb type 1003 |
| Photosensor 41 | Teccor Type Q2004FT1, a cadmium sulfide photoresistor rated for 170 volts AC or DC, operating between the temperatures of −25 to +25 degrees Celsius, 3.3 Kilo-ohms at 2 foot-candles, 165 Kilo-ohms at dark |
| Transistor 43 | 2N 3053 NPN-type transistor |
| Capacitor 44 | 22 microfarad |
| Diode 46 | 2.5 amp, 1 Kilovolt PIV |
| Relay 45 | 10 amp single pole, double throw (SPDT)-type mini, 12 volt DC, 35 milliamperes, 320 ohms |
| Switch 51 | SPDT, 3 amps at 125 volts |
| Resistor 52 | 1 Kilo ohm, 1/2 watt |
| LED 53 | 2.0 volt forward voltage, size T-1, current 10 milliamperes |

While there has been shown and described what is at present considered the preferred embodiments of the present invention, it will be obvious to those skilled in the art that various changes and modifications may be made therein without departing from the scope of the invention as defined by the appended claims.

I claim:

1. A photo-actuated, direct current lamp suitable for use on the exterior of travel trailers, motorhomes, and recreational vehicles, comprising:

a light-shielding, waterproof lamp housing having a narrow, light-admitting first opening therein and a light-transmissive cover, mounted within said lamp housing, a photoreactive control circuit comprising a photosensor connected on a first side to a direct current power source and to the collector of a transistor and on a second side to the base of said transistor, a capacitor connected to the emitter of said transistor, a relay connected to the emitter of said transistor, a diode connected to an output of said relay, said diode being connected to a light bulb, said relay being connected at its common pole to said direct current power source, and said light bulb, said power source, and said relay being connected to a common ground, said photoreactive control circuit being mounted within said lamp housing, and said photosensor in said photoreactive control circuit being aligned with and immediately adjacent said first opening in said lamp housing, and said first opening being sealed with a transparent, electrically non-conducting, waterproof sealing material.

2. A lamp assembly as defined in claim 1 wherein said photoreactive control circuit includes a manual switch intermediate the direct current power source and, on a first side of said manual switch, the junction between said diode and said light bulb, and on a second side of said manual switch, the junction of the relay and second side of the photosensor.

3. A lamp assembly as defined in claim 2 wherein said photoreactive control circuit includes an indicator circuit comprising a resistor connected at a first side to a light emitting diode connected to ground, said indicator circuit being connected at a second side of the resistor to a point intermediate the collector side of said transistor and the second side of the photosensor.

4. An automatic, light-actuated outside appliance control for travel trailers, motorhomes, and recreational vehicles comprising:

a means for connecting an appliance to a direct current power source, a photoreactive control circuit comprising a photosensor connected on a first side to a direct current power source and to the collector of a transistor and on a second side to the base of said transistor, a capacitor connected to the emitter of said transistor, a relay connected to the emitter of said transistor, a diode connected to an output of said relay, said diode being connected to a light bulb, said relay being connected at its common pole to said direct current power source, and said light bulb, said power source, and said relay being connected to a common ground, said photosensor being in placed in a location sensitive to ambient light and shielded from stray light sources, a waterproof housing, the elements of said photoreactive control circuit other than said photosensor being mounted within said housing, and said photoreactive control circuit being connected intermediate said appliance and said direct current power source.

* * * * *